March 7, 1933.  F. C. MORRIS  1,900,298
METHOD OF MAKING BUSHINGS
Filed April 22, 1929
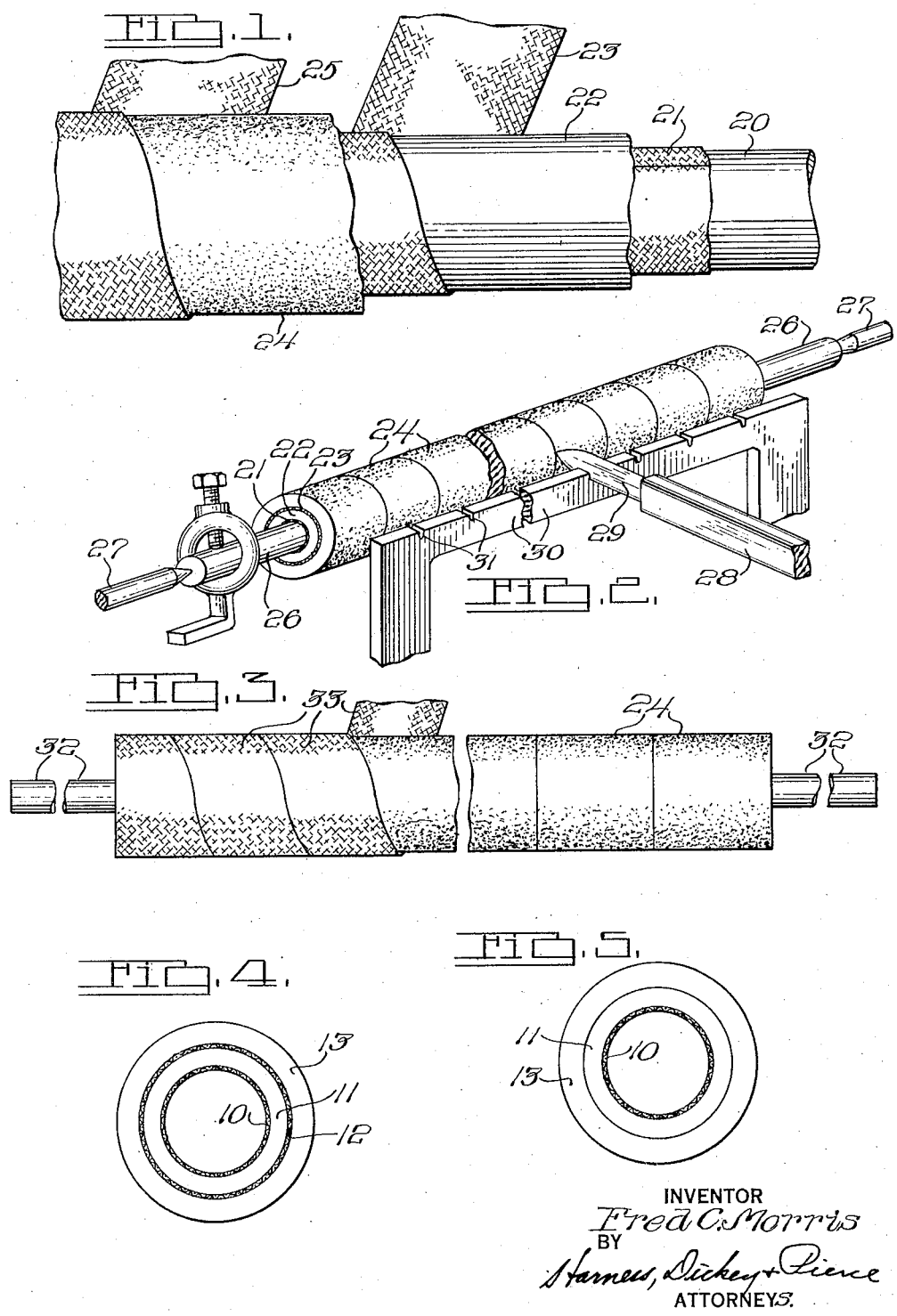

Patented Mar. 7, 1933

1,900,298

UNITED STATES PATENT OFFICE

FRED C. MORRIS, OF SAN FRANCISCO, CALIFORNIA

METHOD OF MAKING BUSHINGS

Application filed April 22, 1929. Serial No. 357,155.

This invention relates to a method of making bushings and particularly to bushings wholly formed of or incorporating in their structure a portion of hard rubber, the principal object being the provision of a new and novel method by which such bushings may be more easily and more economically produced.

Another object is to provide a bushing composed either wholly or partly of hard rubber, in which the rubber is first subjected to a partial or a semi-cure, is then operated upon by a cutting tool, and the curing process is thereafter completed.

Another object is to provide a method of making bushings composed either wholly or in part of hard rubber, in which a length of stock sufficient to produce a number of such bushings is first provided and subjected to a partial or semi-curing process, is then operated upon by a knife to separate the length of stock into lengths substantially corresponding to that desired in the final product, and thereafter completing the curing process.

Another object is to form a bushing composed either wholly or partly of hard rubber by first providing a length of stock sufficient to make a plurality of such bushings and of larger internal diameter than desired in the finished product and partially curing the same, then separating the length of stock into lengths substantially corresponding to that desired in the finished product, and thereafter completing the curing process and reducing the interior diameter to that desired in the final product.

Another object is to provide a method of making bushings comprising in first wrapping a mandril with one or more layers of fabric, surrounding said fabric with a layer of hard rubber stock, surrounding the layer of hard rubber stock with a layer of soft rubber stock, subjecting all of said layers to a vulcanizing process, removing the vulcanized layers from the mandril, placing them on a smaller mandril, and then subjecting them to a curing process.

Another object is to provide a method of making bushings comprising in first wrapping upon a mandril of greater diameter than that of the shaft which the completed bushings are to receive, a layer of fabric, surrounding said layer of fabric with a layer of hard rubber stock, surrounding said layer of hard rubber stock with a layer of soft rubber stock, subjecting said mandril and said layers to a vulcanizing process whereby to effect a partial curing of the hard rubber stock, cutting the partially cured layers to a desired length, assembling such lengths on a mandril substantially corresponding in diameter to the diameter of the shaft which the finished bushings are to receive, and then subjecting the lengths to a further curing process.

Another object is to provide a method of making bushings comprising in surrounding a mandril with a layer of fabric, surrounding the layer of fabric with a layer of hard rubber stock, surrounding the layer of hard rubber stock with a layer of fabric, and surrounding the last mentioned layer of fabric with a layer of soft rubber stock, subjecting the co-operating layers to a vulcanizing process, removing the layers from the mandril, positioning the layers on a second mandril of smaller size and thereafter subjecting the layers to a curing process.

A further object is to provide a method of making bushings comprising in surrounding a mandril with a layer of fabric surrounding the layer of fabric with a layer of hard rubber stock, surrounding the layer of hard rubber stock with a layer of soft rubber stock, subjecting the mandril and the layers to a vulcanizing process, removing the layers from the mandril and replacing them on a smaller mandril, tightly wrapping a layer of fabric over the layers, and then subjecting the layers to a curing process.

The above being among the objects of the present invention, the same consists in certain steps of operation, and combination of steps of operation, to be hereinafter described with reference to the accompanying drawing, and then claimed, having the above and other objects in view.

In the accompanying drawing,

Figure 1 illlustrates one method of assembling the raw stock for a preferred form of bushing.

Figure 2 illustrates the preferred method of cutting the stock to length after the first or semi-curing operation.

Figure 3 illustrates a preferred method of carrying out one of the further steps of my method of operation.

Figure 4 is an end view of a preferred form of my bushing in completed condition.

Figure 5 is an end view of a bushing similar to Figure 4 but of a slightly modified construction.

This invention relates to a method of making bushings in which hard rubber is employed either in whole or in part, and while in the following description I have described the method in connection with a preferred form of bushing for use in connection with the steering columns of motor vehicles, and which incorporated in its construction more than hard rubber only, as fully disclosed in my copending application for Letters Patent of the United States for improvements in Composition bushing, Serial No. 357,157 filed on even date herewith April 22, 1929, it is to be understood that in its broader aspects it is not to be limited to the manufacture of the specific type of bushing therein and herein shown. The type of bushing shown in said co-pending application is illustrated in Figure 4 of the drawing for the present application and comprises an inner layer 10 of fabric, a surrounding layer 11 of hard rubber, a second layer 12 of fabric surrounding the layer of hard rubber which in turn is surrounded by a layer 13 of soft rubber. The second fabric layer 12 may or may not be employed in this form of bushing and when not employed assumes the construction shown in Figure 5, which is identical to that shown in Figure 4 except for the fact that the layer 12 is omitted.

In bushings of this type wherein a shell of hard rubber or other moldable material, which may be cured in a manner similar to hard rubber, is employed, it is desirable for production reasons to form the stock in relatively long lengths and thereafter cut them off to approximately the length desired in the final product. If the hard rubber portion is cured to such an extent, as to fully cured extent, prior to the cutting-off operation, it is necessary, because of the hardness of the rubber, to employ a saw or other material removing cutting device to effect the operation. This is not only considerably slower than by the method herein employed, but further, where fabric is incorporated in the bushing, such cutting devices cause the fabric to be torn and raveled adjacent the point of cutting. Accordingly, it is the primary object of the present invention to provide a method of separating a length of hard rubber stock bushing by means of a knife-like cutting edge whereby no stock is wasted in the cutting operation, whereby no raveling or tearing of any fabric that may be incorporated with the rubber occurs, and which is easily and quickly accomplished.

The following description of the method I employ to form the bushing shown in Figure 4 will illustrate all of the steps needed and which must be considered in constructing a bushing which is made solely from hard rubber stock or is made from a composition of hard rubber stock and any other material such as fabric or soft rubber. Referring to Figure 1, which illustrates the first step of the process in forming a bushing as shown in Figure 4, a mandril 20 is first provided. This mandril 20 is of slightly greater diameter than the diameter of the steering column or other shaft which it is desired that the completed and finished bushing properly and closely receive. The mandril 20 is first wrapped with a layer 21 of fabric which is to constitute the layer 10 in the finished product. This layer 21 may be wrapped either in a spiral direction, or in a circumferential direction as shown, and its outer surface may or may not be suitably frictioned as with rubber composition or other adhesive. Over the layer 21 of fabric is positioned a layer 22 of hard rubber stock which is to constitute the layer 11 in the finished product, and this layer may or may not be surrounded by another layer 23 of fabric, to form the layer 12 in the finished product, according to whether the form of bushing shown in Figure 4 or the form of bushing shown in Figure 5 is desired in the final product. The fabric layer 23 may be wrapped either in a spiral direction as shown, or in a circumferential direction as in the case shown in connection with the layer 21, and either its outer or inner surface or both surfaces may or may not be suitably frictioned as described in connection with layer 21. A layer 24 of soft rubber stock which is to constitute the layer 13, is then provided over the layer 23 where the layer 23 is employed, or directly on the layer 22 when the layer 23 is not employed. I then prefer to tightly wind a strip of fabric, such as 25, around the outer layer 24 so as to compress the entire superposed layers upon the mandril 20. It is to be noted, however, that this step may be dispensed with in some cases.

The mandril 20 with the layers thus wound upon it as described is then subjected to a treatment to produce a vulcanization of the rubber, as to the action of live steam, until the rubber is partly cured but not sufficient to bring the hard rubber stock to a hardened condition. In other words, this step is what I prefer to call a semi-curing process and in which the layers 21 to 24, inclusive, are intimately joined together.

The outer fabric wrapping 25, when employed, is then removed, the now vulcanized length of tubular stock is forced off of the mandril 20, and a mandril such as 26 in Figure 2 is then inserted in the place of the mandril 20. The mandril 26 is preferably of wood for reasons that will hereinafter be apparent, although it will be recognized that the second operation does not absolutely necessitate the replacement of the mandril 20 by the mandril 26, but inasmuch as the mandril 20 is of steel or other suitable metal, its surface might become scored if carried through the second operation.

The mandril 26 is mounted between suitable lathe or other centers such as 27, so as to be rotated, and an instrument such as 28 provided with a knife-like blade 29 is thereupon pressed into the length of stock so as to cut it up into lengths substantially equal to that desired in the final bushings. In this severing operation a steady rest such as 30 is usually employed, and if desired notches such as 31 may be provided therein for guiding the knife, and so spaced as to form a measuring means for cutting off the stock to the proper lengths.

It is to be noted at this point that it is only possible to easily and quickly cut the length of stock to the proper lengths by the use of a knife blade as shown because of the fact that the hard rubber stock has not as yet been brought to a fully cured condition. In other words, it is still sufficiently soft to permit it to be easily cut by the knife blade. It has been previously mentioned that if the hard rubber stock were brought to a hardened condition before this severing operation it would be necessary to either saw the stock to proper length or else employ a cutting tool such as is employed in cutting off metal shafts and the like, and it will be apparent that in such a case, that is by using a sawing or similar tool, it would upon contact with the fabric 21 and 23 tear the same instead of cutting it, and this would ravel and otherwise mutilate the fabric at the point of cutting. It is to be further noted that by being able to employ a knife-like edge such as 29, no loss of stock in the cutting operation occurs such as would occur in sawing or like material removing operations to accomplish the same result.

After the length of stock has been cut to the proper individual lengths as indicated in Figure 2, the individual lengths may then be first treated by dry steam so as to substantially complete the curing process, and then be positioned on a mandril such as 32 and subjected to another treatment as will be described, or they may be positioned directly upon the mandril 32. I prefer to first subject them to a curing process independently of the mandril 32 and thereafter position them on the mandril 32 in end to end relationship as indicated in Figure 5. The mandril 32 is of substantially the same size and preferably very slightly greater in diameter than the diameter of the steering column or other shaft which the bushings are designed to receive when in completed condition. It will be evident that the individual lengths of stock cut off as in Figure 2 could be subjected to this last step separately from each other, but that it will be more economical to assemble a number of them in end to end relationship for this step as indicated in Figure 3. In this step I further prefer to tightly wind the exterior of the bushings with a wrapping of fabric such as 33. The bushings thus mounted upon the mandril 32 are then subjected to a final curing process, as by steam treatment, which causes the bushings to shrink upon the mandril 32 and brings the hard rubber stock to a final hardened condition and the soft rubber stock to a condition of the desired yieldability.

After the bushings and the mandril have cooled sufficiently so as to eliminate any possibility of subsequent change in size they are forced off of the mandril 32 and, where necessary, their external diameters ground to size or grooved where deemed necessary.

It may be noted in connection with the foregoing that it may be deemed desirable in some cases to vary certain details of the steps hereinbefore set out, such as by carrying through the steps as thus described in connection with Figures 1 and 2, only with the inner fabric liner 21 and hard rubber stock 22, and after the cutting off operation as in Figure 2 mold the soft rubber about the thus formed fabric lined hard rubber shell. The hard rubber shell in such case may be either finally cured before the molding operation or may depend upon a final curing step at the time of or after the molding operation. The fabric liner 21, for the purposes for which the bushings shown in Figures 4 and 5 are to be put, is preferably provided with a dry lubricant such as graphite, and this dry lubricant may be applied to the fabric 21 either prior to its application to the mandril 20 or after the bushing is otherwise completed.

While in the above described bushings the fabric liner is employed on the interior, followed by the hard rubber and then by the soft rubber, it will be evident that one or more of these may be reversed in position and yet be the substantial equivalent of the bushing shown.

Formal changes may be made in the specific embodiment of the invention described without departing from the spirit and substance of the broad invention, the scope of which is commensurate with the appended claims.

What I claim is:

1. The method of making hard rubber articles comprising in first forming fabric and uncured hard rubber into stock approximately the desired section of the desired final product and in a length sufficient to form a plurality of said products, subjecting said length of stock to a semi-curing process, then completely severing said length of stock into lengths substantially corresponding with that of said desired final product, and then subjecting said severed lengths to a final curing process.

2. The method of making a bushing comprising in first forming fabric and hard rubber stock into a tube, subjecting said tube to a semi-curing process, completely severing said tube into shorter lengths by a knife-like tool, and then completing the curing of said rubber.

3. The method of forming a bushing comprising in covering a mandril with a layer of fabric, covering said fabric with a layer of hard rubber stock, subjecting said mandril with said fabric and rubber stock thereon to a heat treatment to partially cure said rubber, cutting said partially cured rubber into predetermined lengths, and thereafter subjecting said lengths to a final curing process.

4. The method of forming a bushing comprising in covering a mandril with a layer of fabric, covering said fabric with a layer of hard rubber stock, subjecting said mandril with said fabric and rubber stock thereon to a heat treatment to partially cure said rubber, cutting said partially cured rubber into predetermined lengths, placing said lengths on a mandril of smaller diameter than the first mentioned mandril, and thereafter subjecting said lengths to a final curing process.

5. The method of forming a bushing comprising in covering a mandril with a layer of fabric, covering said fabric with a layer of hard rubber stock, subjecting said mandril with said fabric and rubber stock thereon to a heat treatment to partially cure said rubber, cutting said partially cured rubbed into predetermined lengths, placing said lengths on a mandril of smaller diameter than the first mentioned mandril, placing said lengths under a compressive pressure, and thereafter subjecting said lengths to a final curing process.

6. The method of forming a bushing comprising in covering a mandril with a layer of fabric, covering said fabric with a layer of hard rubber stock, subjecting said mandril with said fabric and rubber stock thereon to a heat treatment to partially cure said rubber, cutting said partially cured rubber into predetermined lengths, removing said lengths from said mandril and subjecting them to a further curing process, then placing said lengths on a mandril of smaller diameter than the first mentioned mandril and subjecting them to a compression action in the presence of heat.

7. The method of making a bushing comprising in arranging superposed layers of fabric and rubber stock on a mandril, semi-curing said rubber stock while on said mandril, cutting said semi-cured stock into separate pieces and then finally curing said rubber stock in said pieces.

8. The method of making a bushing comprising in arranging superposed layers of hard and soft rubber stock on a mandril, subjecting said stock while on said mandril to vulcanizing process insufficient to completely cure said hard rubber stock, cutting said partly cured stock to length, and then finally curing said stock.

9. The method of making a bushing comprising in arranging superposed layers of fabric, hard rubber stock, and soft rubber stock upon a mandril, subjecting said mandril with said layers to a heating action whereby to vulcanize said layers together and partly cure said rubber stock, then serving said vulcanized layers into sections of predetermined lengths, and then finally curing said rubber stock.

10. The process of forming a bushing comprising encircling a mandril with a layer of fabric, surrounding said fabric with a layer of moldable material rigid when completely vulcanized, surrounding the last mentioned layer with a layer of material resilient when completely vulcanized, subjecting said mandril with said layers thereon to a temperature sufficient to cause said layers to adhere together, cutting the bushing to length and then completely vulcanizing the bushings.

11. The process of forming a bearing comprising encircling a mandril with a layer of fabric, covering said fabric with a layer of hard rubber, encircling said hard rubber with a layer of soft rubber, subjecting said mandril and layers to a vulcanizing process, removing said layers as a unit and placing them on a mandril of smaller diameter than the first mentioned mandril, then subjecting the second mentioned mandril and layers thereon to a curing process and then removing the article from the mandrel.

12. The process of forming a bushing comprising covering a mandril with a layer of dry lubricant impregnated fabric, covering said fabric with a layer of hard rubber, surrounding said hard rubber with a layer of fabric, surrounding the last mentioned layer of fabric with a layer of soft rubber, submitting said mandril and said layers to a vulcanizing process, removing said layers as a unit from said mandril and placing said layers on a smaller mandril, then subjecting said smaller mandril and said layers to a curing process and then removing the article from the mandrel.

13. The process of forming a bushing comprising encircling a mandril with a layer of fabric, surrounding said fabric with a layer of hard rubber, surrounding said hard rubber with a second layer of fabric, surrounding said second layer of fabric with a layer of soft rubber, encasing said soft rubber with a shape maintaining part, subjecting said mandril with said layers and said part to a vulcanizing process, removing said part from said layers and said layers from said mandril, placing said layers on a smaller mandril, then subjecting said smaller mandril and said layers to a curing process and then removing the article from the mandrel.

14. The process of forming an article comprising rubber, which includes disposing rubber stock about a mandrel, subjecting such stock to a partial cure, removing the partially cured stock from the mandrel and mounting it on a mandrel of slightly smaller size as compared to the size of the first mandrel then completing the vulcanizing process with respect to the rubber stock and then removing the article from the mandrel.

15. The process of forming an article comprising rubber, which includes disposing layers of hard and soft rubber in superimposed relation, about a mandrel, subjecting the rubber stock to a partial cure, removing the stock from the mandrel and placing it on a mandrel of slightly smaller size as compared to the size of the first mandrel then completing the vulcanizing process with respect to the rubber stock and then removing the article from the mandrel.

FRED C. MORRIS.